July 30, 1968
J. L. URNER ET AL
3,394,859
DEVICE FOR WELDING HEAT EXCHANGER TUBES
Filed July 28, 1966
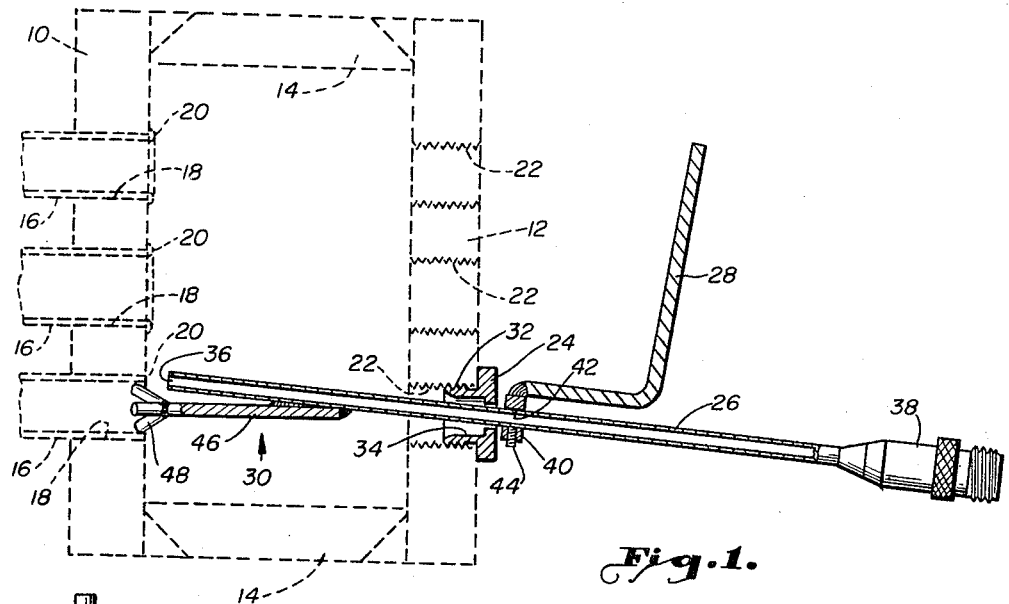
Fig. 1.
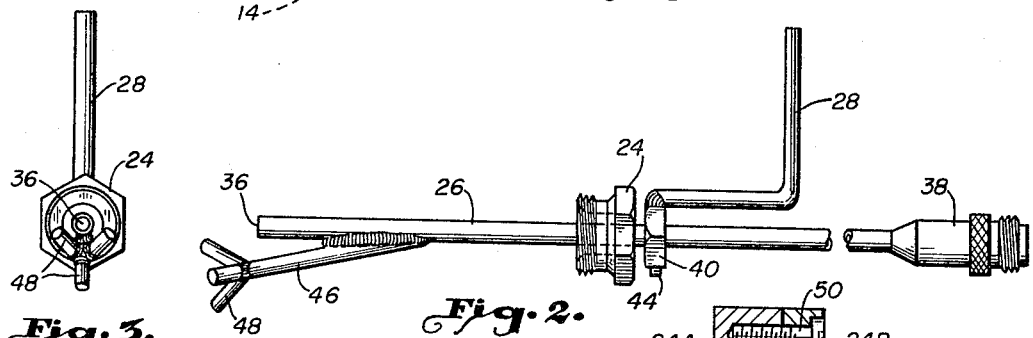
Fig. 3.  Fig. 2.
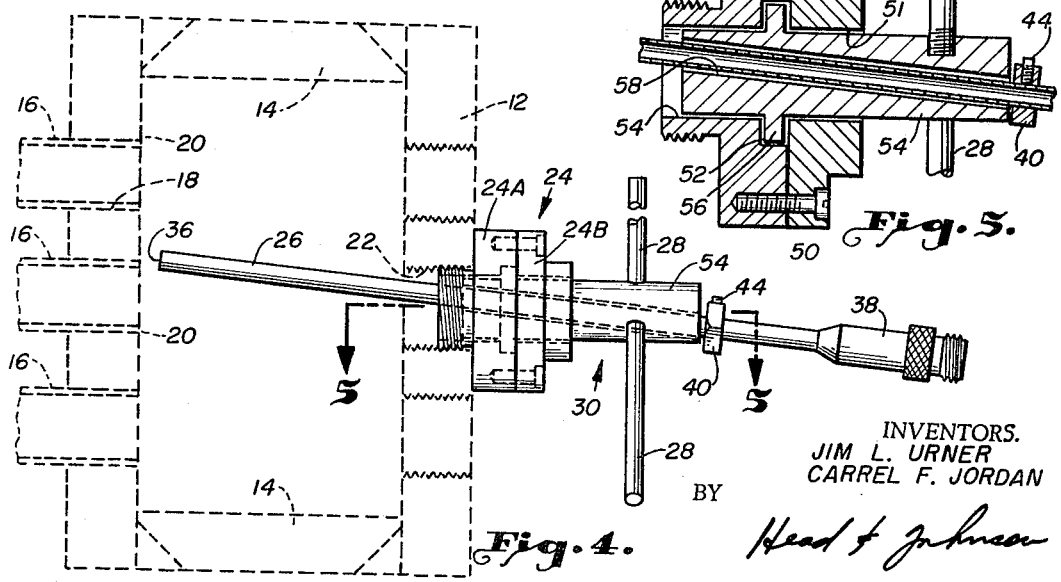
Fig. 5.
Fig. 4.
INVENTORS.
JIM L. URNER
CARREL F. JORDAN
BY Head & Johnson
ATTORNEYS

United States Patent Office 3,394,859
Patented July 30, 1968

3,394,859
DEVICE FOR WELDING HEAT EXCHANGER TUBES
Jim L. Urner, Broken Arrow, and Carrel F. Jordan, Tulsa, Okla., assignors to The Happy Company, Tulsa, Okla., a corporation of Oklahoma
Filed July 28, 1966, Ser. No. 568,622
7 Claims. (Cl. 228—25)

This invention relates to devices for welding heat exchanger tubes. More particularly, the invention relates to a device for use in welding tubes each received in a tube opening in a tube plate, the tube plate having a paralleled clean-out plate spaced therefrom, the clean-out plate having a clean-out opening in coaxial alignment with each of the tube openings, the device including means of welding the ends of the tubes to the tube plate.

Air cooled heat exchangers are typically assembled using two headers connected to each other by a multiplicity of heat exchanger tubes. The headers are more or less in the form of conduits or manifolds providing relatively large fluid flow space therein and providing means for receiving the heat exchanger tubes. Typically, each header includes two parallel spaced apart plates. One of the plates, termed the tube plate, has openings therein which receives the heat exchanger tubes. The other plate, spaced from the tube plate, is termed the clean-out plate and has openings coaxial with the tube openings of the tube plate. The openings in the clean-out plate are usually threaded and closed with threaded plugs. The tube and clean-out plates are supported in spaced parallel arrangement by parallel spacer plates so that a closed fluid flow chamber is provided communicating with the open end of each of the tubes received in the tube plates. A typical heat exchanger includes two headers with heat exchanger tubes therebetween.

In the usual air cooled heat exchanger design openings in the tube plate are drilled to closely receive the tubes therein, the tubes then being enlarged by mechanical tube expanding tools to seal against the interior circumference of the tube openings. In this way no welding of the tube to the tube plate is required. In certain applications, however, particularly where poisonous liquids or gases are involved, it is imperative that not the slightest degree of leakage of the liquid or gases within the heat exchanger be permitted. In this case reliance upon expansion of the heat exchanger tube to completely seal against the tube plate is not satisfactory since any small leakage, which would normally not be sufficiently detrimental to be of great concern, could, when poisonous liquids and gases are involved, cause injury or death.

In addition, in some air cooled heat exchanger applications, particularly wherein great pressures are encountered, it is desirable that the heat exchanger tubes be welded to the headers to achieve integral construction capable of withstanding increased pressures without leakage.

For these reasons it has become important in some air cooled heat exchanger applications to be able to weld the tubes to the heat exchanger headers. Usually such headers are elongated box type sections and the only means heretofore on completely enclosed headers known for welding the tubes to the headers is for the welder to extend the torch through an opening in the clean-out plate opposite the tube to be welded and perform the welding operation while looking through one of the other clean-out openings. This obviously is a very tedious and time consuming operation, and achieving effective and uniform welds is extremely difficult.

It is therefore an object of this invention to provide an improved device for use in welding tubes in a heat exchanger.

More particularly, an object of this invention is to provide a device for use in welding the ends of tubes each of which are received in a tube opening in a tube plate having a parallel clean-out plate spaced therefrom, the clean-out plate having a clean-out opening in coaxial alignment with each of said tube openings in said tube plate.

These and other objects will be fulfilled and better understanding of the invention had by reference to the following description and claims, taken in conjunction with the attached drawings in which:

FIGURE 1 is a side view of one embodiment of the improved welding device of this invention showing the device as used to weld tubes in a typical air cooled heat exchanger header.

FIGURE 2 is a side view of the welding device as utilized in the embodiment of FIGURE 1.

FIGURE 3 is an end view of the welding device of FIGURES 1 and 2.

FIGURE 4 is a view of an alternate embodiment of the welding device of this invention shown as used to weld tubes to an air cooled heat exchanger header.

FIGURE 5 is a fragmentary cross-sectional view of the alternate embodiment of the welding device of this invention taken along the line 5—5 of FIGURE 4.

Referring now to the drawings and first to FIGURES 1, 2 and 3, the first embodiment of the invention is illustrated. The invention is utilized to weld tubes to an air cooled heat exchanger header. Shown in dotted outline is a cross-section of an air cooled heat exchanger header including a tube plate 10 and, spaced from it, a clean-out plate 12. Paralleled spacer plates 14 support the clean-out plate 12 and tube plate 10 in proper relationship to each other, the plates 10, 12 and 14 forming a closed header box section. In the typical air cooled heat exchanger two of such box sections are utilized connected by a multiplicity of heat exchanger tubes 16. Tube openings 18 are formed in tube plate 10, each receiving a tube 16. As previously described, in some types of air cooled exchangers, tubes 16 are not welded directly to the tube plate 10 but depend upon a mechanical tube expansion that expands the tubes into sealed engagement with openings 18. In some types of applications it is imperative that absolutely no leakage of fluid or gases occur. For this reason, as well as others, ends 20 of each of the tubes 16 must be welded to tube plate 10.

A clean-out opening 22 is formed in the clean-out plate 12 coaxial with each tube opening 20 in tube plate 10. Clean-out openings 22 are normally threaded and receive a closed plug (not shown). The clean-out openings 22 are, as the term applies, used primarily for cleaning out the tubes 16 if they become clogged with scale.

The device described to this point sets forth the environment in which the invention functions and includes no part of the actual invention.

This invention consists basically of a body member 24, a tubular welding torch 26, a handle means 28 and a means for aligning the torch relative to the tubular opening 18, the last means being generally identified by numeral 30.

In the embodiments of FIGURES 1, 2 and 3 the body member 24 is in the form of a bushing having a reduced diameter threaded portion 32 which, in application, is threadably received into one of the clean-out openings 22. The body member 24 has an axial opening 34 therethrough which rotatably receives welding torch 26.

Torch 26 has an outer end 36 which is spaced from the interior end 20 of tube 16. The tube end 20 is preferably in the plane of the interior wall of the tube plate 10. The end of the torch 26 is spaced from the tube end 20 a predetermined amount required for proper welding according to factors including the type of welding to be undertaken, the materials to be welded, the thickness of the materials, the diameter of the welding torch 26, and so forth, but typically the spacing will be approximately one-half inch. The exact configuration and type of welding torch 26 is not within the purview of this invention since welding torches are well known. The type of torch which functions exceedingly successfully includes the type wherein the welding wire (not shown) is fed automatically internally of the torch 26 in the welding process. The operator actuates the devices to cause gas flow through the torch 26 and at the same time a welding wire is continuously and automatically advanced, the welding taking place by the metalarc inert gas process. The welding torch 26 may include a swivel portion 38 so that as the torch is rotated such rotary motion will not impart a twist into the lines connecting to the torch.

Handle 28 includes a collar 40 having an opening 42 which receives the torch 26. A set screw 44 is used to engage the torch so that when the collar 40 is contacted with the body member 24 the end 36 of the torch is properly spaced from the tubing 20. Handle 28 is affixed to the collar 40 such as by welding.

The alignment means, as illustrated in the embodiment of FIGURE 1, includes a centering member 46 which is affixed at one end to the torch 26. The other end of a centering member 46 has a three-point arrangement, termed a centering element 48, which engages the interior of the tube 16 so that the centering member 46 is supported coaxially with the tube 16. The centering element 48 is obviously subject to a great variety of configuration, the illustrated embodiment being one easily manufactured by welding three extending portions onto one end of the centering member 46.

Referring now to FIGURES 4 and 5, an alternate embodiment of the invention is shown. In this embodiment the aligning means, generally indicated by the numeral 30, is formed as a rotatable member contained within the body member 24. Body member 24 is formed of two components, designated as body member flange portion 24A and body cover portion 24B. The body flange portion 24A has an integral reduced diameter extending threaded portion 32 which, in the application of the invention, is threadably positioned in a threaded clean-out opening 22 in clean-out plate 12. Body flange portion 24B is removably affixed to the portion 24A by means of bolts 50.

The body portions 24A and 24B each have a coaxial tubular opening 51 therethrough and provide an enlarged diameter coaxial recess 52 which in the illustrated embodiment is formed in body portion 24A although obviously it could be formed in portion 24B or partially in each of these members.

The aligning means 30 in the alternate embodiment includes a torch holder 54, at least a portion of which is cylindrical and is rotatably received in the tubular openings 51 of body portions 24A and 24B. The torch holder includes an enlarged circumferential diameter portion 56 which is rotatably received in the enlarged internal diameter recess 52 of body portion 24A so that the torch holder 54 is rotatably and substantially non-longitudinally displaceably held by the body member.

Torch holder 54 includes a torch receiving opening 58 therethrough which rotatably receives the tubular welding torch 26. Torch opening 58 is displaced relative to the cylindrical axis of torch holder 54 so that the welding torch 26 extends to intersect the periphery of a tube opening 18.

A stop collar 40 is affixed to the exterior of the welding torch 26 and includes a set screw 44 so that the torch, when inserted into the holder 54, is positioned so that the discharge end 36 is properly spaced from the interior surface of the tube plate 10, as in the previously described embodiment. Handles 28 extend radially from the torch holder 54.

The embodiment of the invention shown in FIGURES 4 and 5 functions as substantially previously described with relation to the first embodiment. The basic difference in the embodiments is that in FIGURES 4 and 5 no centering device is utilized relative to the tube opening but instead the welding torch is properly positioned to circumscribe the periphery of an opening 18 in tube plate 10 by the displacement of the torch receiving opening 58 relative to the cylindrical axis of torch holder 54. To effect welding of a tube 16 to tube plate 10, the operator threads the body member 24 into an opposed clean-out opening 22 and inserts the welding torch 26 into torch receiving opening 58 in the torch holder 54. The welding process is initiated by depressing a button in the portion of the welding equipment not a part of this invention and not illustrated. When welding is initiated the operator turns handle 28 moving the torch 26 so that the axial intersection thereof travels around the circumference of tube opening 18, progressively welding around the total periphery of end 20 of a tube 16. Upon completion of 360° of rotation of torch holder 54 the welding procedure is terminated.

In the embodiment of FIGURES 1 through 3 the torch 26 is rotated relative to a swivel portion 38. In the embodiment of 4 and 5 the torch 26 itself is not rotated since rotatable relationship is provided between the torch and the torch holder 54.

This invention provides a greatly improved means of welding tubes to a header of an air cooled heat exchanger. The positioning of the welding torch does not depend upon dextrous manual manipulation of the operator. The operator can observe the welding process to most effectively control the rate of rotation of the tool and to coincide the termination of welding with the reaching of the previously welded portion of the circumference, the tube being welded by observation, but such observation does not require the meticulous coordination of the movement of the welding torch as is required in the manual method now in use.

The invention has been described with a certain degree of particularity but it is manifest that many changes may be made in the details of construction and the arrangement of components without departing from the spirit and scope of this disclosure.

What is claimed:

1. For use in welding, by means of a welding torch, the ends of tubes each of which extend through a tube opening in a tube plate, the tube plate having a paralleled clean-out plate spaced therefrom, the clean-out plate having a threaded clean-out opening aligned with each of said openings in said tube plate, a welding adaptor comprising:

a tubular body member having a threaded portion threadably insertable into a clean-out opening in a clean-out plate, the tubular opening of said body member being thereby aligned with a tube opening in a spaced tube plate;

a torch holder rotatably received by said tubular body member, the axis of rotation of said torch holder being thereby coincident with a tube opening, the torch holder having a cylindrical torch receiving opening therethrough, the axis of which is displaced from the axis of rotation of said torch holder, the axis of said torch receiving opening being coincident with the periphery of a tube opening; and handle means affixed to and extending from said torch holder for the rotation thereof whereby upon rotation of said torch holder the intersection of the axis of said torch receiving opening describes a circle substantially coincident with a tube opening.

2. A welding adaptor according to claim 1 including means retaining a welding torch positioned in said torch receiving opening of said torch holder in preselected spaced relationship with the tube plate.

3. A welding adaptor according to claim 2 wherein said means of retaining a welding torch positioned in said torch receiving opening of said torch holder in preselected spaced relationship with the tube plate includes a collar member having a torch receiving opening therein and a set screw intersecting said opening, said collar member being positioned on said torch contiguous to said torch holder.

4. For use in welding the ends of tubes each of which are received in a tube opening in a tube plate having a paralleled clean-out plate spaced therefrom, the clean-out plate having a clean-out opening in coaxial alignment with each of said tube openings in said tube plate, the combination of:
- a body member having at least a portion thereof positionable in a clean-out opening of a clean-out plate, the body member having an axial opening therein which, when the body member is positioned in an opening in a clean-out plate, is coaxial with a tube opening in a tube plate;
- a tubular welding torch having a discharge end rotatably positioned in said body member axial opening, the discharge end of said torch being spaced from the tube plate;
- handle means affixed to said torch for the rotation thereof; and
- means of aligning the said torch whereby the axis thereof intersects the periphery of a tube opening in the tube plate and whereby the intersection of the torch axis with the tube plate describes a circle as said torch is rotated substantially coincident with the periphery of a tube opening in the tube plate.

5. The combination of claim 4 wherein said means aligning the said torch whereby the axis thereof intersects the periphery of a tube opening in the tube plate and whereby the intersection of the torch axis with the tube plate describes a circle as said torch is rotated substantially coincident with the periphery of a tube opening in the tube plate includes a centering member affixed to said welding torch adjacent said discharge end, said centering member rotatably receivable by a tube opening in the tube plate.

6. The combination of claim 4 wherein said means aligning the said torch whereby the axis thereof intersects the periphery of a tube opening in the tube plate and whereby the intersection of the torch axis with the tube plate describes a circle as said torch is rotated substantially coincident with the periphery of a tube opening in the tube plate, includes:
- a torch holder rotatably received by said body member, the axis of rotation of said torch holder being thereby coincident with a tube opening, the torch holder having a cylindrical torch receiving opening therethrough, the axis of which is displaced from the axis of rotation of said torch holder, the axis of said torch receiving openings being coincident with the periphery of said tube opening.

7. The combination of claim 4 wherein the clean-out openings of the clean-out plate are threaded and wherein said body member has a threaded portion receivable by the clean-out openings.

References Cited

UNITED STATES PATENTS 2,149,861   3/1939   Morton _____ 228—25

RICHARD H. EANES, JR., *Primary Examiner.*